US008332815B2

(12) United States Patent
Balfe et al.

(10) Patent No.: US 8,332,815 B2
(45) Date of Patent: Dec. 11, 2012

(54) ENHANCED DEVELOPMENT TOOL FOR UTILIZING A JAVASCRIPT OBJECT NOTATION (JSON) BRIDGE FOR NON-JAVA-BASED COMPONENT COMMUNICATION WITHIN JAVA-BASED COMPOSITE APPLICATIONS

(75) Inventors: Robert A. Balfe, Whiteboro, NY (US); Charles P. Imperato, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 12/405,849

(22) Filed: Mar. 17, 2009

(65) Prior Publication Data
US 2010/0242018 A1 Sep. 23, 2010

(51) Int. Cl.
G06F 9/44 (2006.01)
(52) U.S. Cl. .................. 717/118; 717/115; 717/137
(58) Field of Classification Search .................. None
See application file for complete search history.

(56) References Cited

U.S. PATENT DOCUMENTS

| 6,569,207 | B1 | 5/2003 | Sundaresan | |
|---|---|---|---|---|
| 2002/0073119 | A1 | 6/2002 | Richard | |
| 2004/0148570 | A1 | 7/2004 | Sengodan | |
| 2005/0086587 | A1* | 4/2005 | Balz | 717/118 |
| 2006/0047780 | A1* | 3/2006 | Patnude | 717/137 |
| 2007/0061708 | A1 | 3/2007 | Kothari et al. | |
| 2007/0094597 | A1* | 4/2007 | Rostom | 717/118 |
| 2008/0205655 | A1* | 8/2008 | Wilkins et al. | 717/118 |
| 2009/0024986 | A1* | 1/2009 | Meijer et al. | 717/137 |
| 2010/0005400 | A1* | 1/2010 | Swift | 717/115 |
| 2010/0031233 | A1* | 2/2010 | Li et al. | 717/115 |

FOREIGN PATENT DOCUMENTS
CN 1746844 A 3/2006
(Continued)

OTHER PUBLICATIONS

D. Soroker, User-Driven Visual Mashups in Interactive Public Spaces, 2008, ACM, 10 pages, <URL: http://delivery.acm.org/10.1145/1600000/1595032/a43-soroker.pdf>.*

(Continued)

Primary Examiner — Thuy Dao
Assistant Examiner — Hua Lu
(74) Attorney, Agent, or Firm — Patents on Demand P.A.; Brian K. Buchheit; Scott M. Garret (57) ABSTRACT

Utilizing a JAVASCRIPT Object Notation (JSON) bridge during JAVA-based composite application development can begin with the receipt of a command to present the wiring diagram of a JAVA-based composite application by an enhanced JAVA-based composite application development tool. The JAVA-based composite application can consist of one or more JAVA-based components and non-JAVA-based components, with one property of a JAVA-based component being communicatively wired to a non-JAVA-based component. A JSON bridge can acknowledge the accessing of the JAVA-based composite application. The wiring diagram of the JAVA-based composite application can then be visually rendered. For the property of the JAVA-based component communicatively wired to the non-JAVA-based component, a user-selectable option to utilize the JSON bridge for communication can be presented. With the JSON bridge option selected, user-entered changes to this property can automatically invoke the JSON bridge to communicate related data to the communicatively wired non-JAVA-based component.

20 Claims, 3 Drawing Sheets

FOREIGN PATENT DOCUMENTS

| JP | 2003036223 | 2/2003 |
|---|---|---|
| JP | 2004348450 | 12/2004 |
| WO | 0186427 A2 | 11/2001 |

OTHER PUBLICATIONS

Quanzhong Li, XVM: A Bridge between XML Data and Its Behavior, 2004, ACM, 9 pages, <URL: http://delivery.acm.org/10.1145/990000/988694/p155-li.pdf>.*

Jing Xie, ASIDE: IDE Support for Web Application Security, 2011, ACM, 10 pages, <URL: http://delivery.acm.org/10.1145/2080000/2076770/p267-xie.pdf>.*

Norman H. Cohen, EventScript: An Event-Processing Language Based on Regular Expressions with Actions, 2008, ACM, 10 pages, <URL: http://delivery.acm.org/10.1145/1380000/1375673/p111-cohen.pdf>.*

Simon Mayer, Facilitating the Integration and Interaction of Real-World Services for the Web of Things, Google Scholar, 2010, 6 pages, <URL: http://www.webofthings.org/urban-iot/2010/pdfs/Mayer.pdf>.*

Massimiliano Rak, Cloud-based Concurrent Simulation at Work: Fast Performance Prediction of Parallel Programs, Google Scholar, 2010, 7 pages, <URL: http://deal.ing.unisannio.it/perflab/assets/papers/wetice2012.pdf>.*

* cited by examiner

ENHANCED DEVELOPMENT TOOL FOR UTILIZING A JAVASCRIPT OBJECT NOTATION (JSON) BRIDGE FOR NON-JAVA-BASED COMPONENT COMMUNICATION WITHIN JAVA-BASED COMPOSITE APPLICATIONS

BACKGROUND

The present invention relates to the field of composite application development and, more particularly, to an enhanced development tool for utilizing a JAVASCRIPT Object Notation (JSON) bridge for non-JAVA-based component communication within JAVA-based composite applications.

Composite applications are a flexible means for providing users with a collective presentation of data obtained from a variety of existing sources. A composite application consists of multiple decoupled components that provide data and/or functionality, such as Web services and enterprise applications. Interaction among components is defined by wires that connect a data property of one component to an action of another component. For example, changing the date in a calendar component causes a datebook component to display stored appointments for that date.

The components comprising a composite application can be written in various programming languages. However, current JAVA-based development tools used to create composite applications do not easily facilitate the use of components that are written in non-JAVA-based programming languages. For example, within the JAVA-based LOTUS NOTES development environment, sending property data from a JAVA-based component to a C-based component requires the definition a complex, user-provided marshalling procedure.

In order to take advantage of non-JAVA-based components, developers are required to understand the marshalling process, the JAVA programming language, and the composite application architecture. These additional burdens on the developer hinder the use of non-JAVA-based components. Thus, a developer is required to create a JAVA-based counterpart to the non-JAVA-based component, find a JAVA-based component that provides comparable functionality, or exclude the functionality from the composite application, all of which increase project time and cost.

Attempts to remedy this situation have produced the concept of JAVASCRIPT Object Notation (JSON) bridges, which translate a source data type into JSON. JSON is an ideal communication medium between disparate components due to its programming neutral nature. However, current JAVA-based development tools for composite applications do not provide a user-friendly means to utilize a JSON bridge from within their graphical interface.

BRIEF SUMMARY

One aspect of the present invention can include a method for utilizing a JAVASCRIPT Object Notation (JSON) bridge during JAVA-based composite application development. Such a method can begin with the receipt of a user-selected command to present a wiring diagram of a JAVA-based composite application by an enhanced JAVA-based composite application development tool (e.g., an ECLIPSE based tool). The JAVA-based composite application can consist of one or more JAVA-based components and one or more non-JAVA-based components, such that one property of a JAVA-based component can be communicatively wired to a non-JAVA-based component. Access of the JAVA-based composite application can be acknowledged by the JSON bridge, which can establish a communication pathway for the JSON bridge to receive information about user-executed commands performed within the enhanced JAVA-based composite application development tool. The wiring diagram of the JAVA-based composite application can be visually rendered within a wiring interface of the enhanced JAVA-based composite application development tool. For each property of a JAVA-based component communicatively wired to a non-JAVA-based component, a user-selectable option to utilize the JSON bridge can be presented within the wiring interface. The JSON bridge can be a component of the JAVA-based composite application framework in which the JAVA-based composite application and the enhanced JAVA-based composite application development tool operate. When a user-entered change occurs to the property of the JAVA-based component communicatively wired to the non-JAVA-based component and the JSON bridge option is selected, the JSON bridge can be automatically invoked to communicate the data associated with the user-entered change to the communicatively wired non-JAVA-based component. The data can be stored within a source document that conforms to a standardized markup language.

Another aspect of the present invention can include a system for utilizing a JAVASCRIPT Object Notation (JSON) bridge during JAVA-based composite application development. Such a system can include a JSON bridge and an enhanced JAVA-based composite application development tool. The JSON bridge can be configured to transform data from a source data type into JSON. The enhanced JAVA-based composite application development tool can be configured to allow a property of a JAVA-based component to be configured to utilize the JSON bridge to communicate with a non-JAVA-based component. Both the JAVA-based component and the non-JAVA-based component can be elements of the same JAVA-based composite application. Data for the property can be designated for consumption by the non-JAVA-based component.

Yet another aspect of the present invention can include an enhanced JAVA-based composite application development tool. The enhanced JAVA-based composite application development tool can consist of a wiring interface and a JSON bridge usage selector. The wiring interface can be configured to provide a graphical programming medium for defining communication pathways for a JAVA-based composite application. The JAVA-based composite application can include one or more JAVA-based components and non-JAVA-based components, with a property of a JAVA-based component communicatively wired to a non-JAVA-based component. The JSON bridge usage selector can be configured to indicate the user-configuration of the property to utilize a JSON bridge for communicating data to the non-JAVA-based component. The data can be contained within a source document that can conform to a standardized markup language.

DETAILED DESCRIPTION

The present invention discloses an enhanced JAVA-based composite application development tool for utilizing a JAVA-SCRIPT Object Notation (JSON) bridge for communication between a JAVA-based component and a non-JAVA-based component of a JAVA-based composite application. The enhanced JAVA-based composite application development tool can allow access to the functionality of the JSON bridge within its graphical programming environment, such as a wiring interface, via a JSON bridge usage selector. User-configuration of the JSON bridge usage selector for a JAVA-based component property can automatically invoke the JSON bridge to transform changes to the property data into JSON prior to transmission to the non-JAVA-based component.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device.

Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
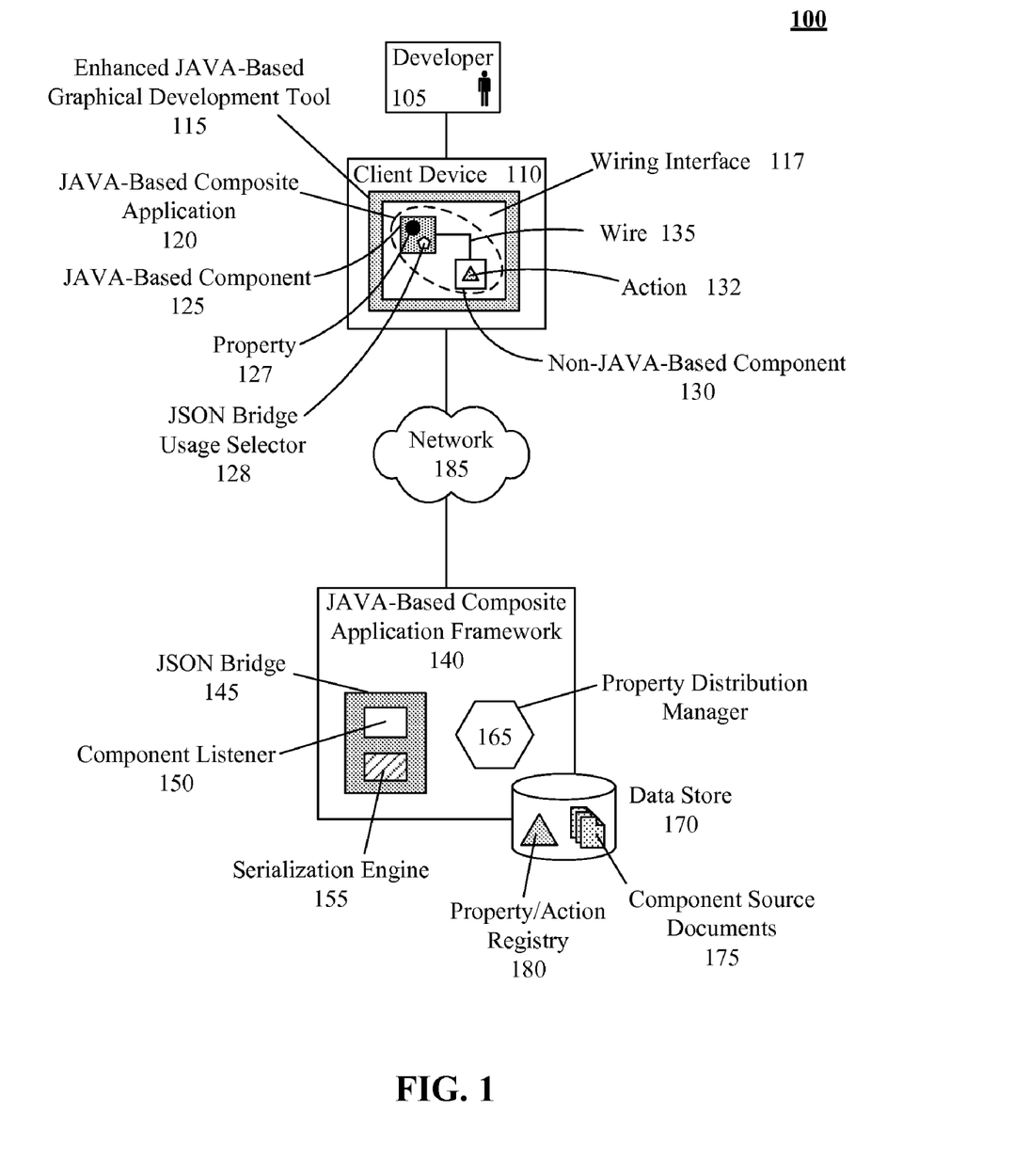
FIG. 1 is a schematic diagram illustrating a system that utilizes a JSON bridge in conjunction with an enhanced JAVA-based graphical development tool for the development of JAVA-based composite applications in accordance with embodiments of the inventive arrangements disclosed herein.

FIG. 1 is a schematic diagram illustrating a system 100 that utilizes a JSON bridge 145 in conjunction with an enhanced JAVA-based graphical development tool 115 for the development of JAVA-based composite applications 120 in accordance with embodiments of the inventive arrangements disclosed herein. In system 100, a developer 105 can access functionality provided by the JSON bridge 145 from an enhanced JAVA-based graphical development tool 115 running on a client device 110 when creating a JAVA-based composite application 120.

The developer 105 can utilize the enhanced JAVA-based graphical development tool 115 running on a client device 110 to create a JAVA-based composite application 120. The client device 110 can represent a variety of electronic computing devices capable of executing the enhanced JAVA-based graphical development tool 115 and interacting with the JAVA-based composite application framework 140 over a network 185.

The JAVA-based composite application framework 140 can represent the hardware and/or software required to support the development and operation of the JAVA-based composite application 120, such as enterprise applications and data repositories. Elements of the JAVA-based composite application framework 140 can include a JSON bridge 145 and a property distribution manager 165.

It should be noted that the JAVA-based composite application framework 140 can include a variety of elements and configurations. The elements 145 and 165 illustrated in system 100 are of particular relevance to one or more embodiments of the present invention.

The JSON bridge 145 can represent a set of software instructions configured to convert input data from one data type into JSON, a text-based data interchange format easily used by a wide variety of programming languages. For example, the tags of an eXtensible Markup Language (XML) document can be converted into JSON by an XML-to-JSON bridge 145. The JSON bridge 145 can include multiple conversion algorithms to support various types of input data. A JSON bridge 145 can include a component listener 150 and a serialization engine 155.

The property distribution manager 165 can represent the element of the JAVA-based composite application framework 140 that stores and distributes data. The framework 140 can utilize data store 170 to register and manage properties and actions in a property and action registry 180. Further, data store 170 can store one or more component source documents 175, which are associated with a JAVA-based composite application 120.

The enhanced JAVA-based graphical development tool 115 can represent a JAVA-based development tool that provides a graphical programming interface in which a JAVA-based composite application 120 can be created. For example, the enhanced JAVA-based graphical development tool 115 can utilize the ECLIPSE framework and ECLIPSE WORKBENCH interface.

A JAVA-based composite application 120 can represent a software application whose functionality originates from the collective operation of multiple autonomous components 125 and 130. For the purposes of highlighting this embodiment of the present invention, the components 125 and 130 of the JAVA-based composite application 120 are categorized as JAVA-based components 125 and non-JAVA-based components 130.

A JAVA-based component 125 can represent an autonomous software application written in a programming language that is compliant with the JAVA language specification supported by the enhanced JAVA-based graphical development tool 115 and the JAVA-based composite application framework 140 supporting the JAVA-based composite application 120. Additionally, communication between JAVA-based components 125 can be inherently supported by the enhanced JAVA-based graphical development tool 115 and JAVA-based composite application framework 140.

A non-JAVA-based component 130 can represent an autonomous software application written in a programming language that is not compliant with the supported JAVA language specification of the enhanced JAVA-based graphical development tool 115 and JAVA-based composite application framework 140. For example, an application written using the C language would be considered a non-JAVA-based component 130, whereas an application written in JAVASCRIPT would be considered a JAVA-based component 125.

A component 125 or 130 of a JAVA-based composite application 120 can consist of properties 127 and actions 132. A property 127 can represent various data elements of a component 125 or 130. Changes to the value of a property 127 can trigger an associated action 132 in the component 125 or 130 to which the property 127 has been communicatively linked. For example, selecting a team member's name in an instant messaging component can display their list of current projects in a project management component.

While the enhanced JAVA-based graphical development tool 115 can include a variety of interfaces that provide specialized functionality, of particular relevance to this embodiment of the invention is the interface in which connectivity between the components 125 and 130 can be defined, generally referred to as a wiring interface 117. Communication between components 125 and 130 of a JAVA-based composite application 120 can be represented by wires 135. A wire 135 can connect a property 127 of one component 125/130 to the action 132 of another component 125/130.

In this example, the JAVA-based composite application 120 shown in the wiring interface 117 of the enhanced JAVA-based graphical development tool 115 depicts a property of a JAVA-based component 125 connected with a wire 135 to a non-JAVA-based component 130. It should be noted that while other wiring configurations are possible (e.g., JAVA component to JAVA component and non-JAVA component to non-JAVA component), the focus of this embodiment of the present invention is communication from the JAVA-based component 125 to the non-JAVA-based component 130.

The difference in programming language between the non-JAVA-based component 130 and the Since the enhanced JAVA-based graphical development tool 115 does not inherently support communication with the non-JAVA-based component 130, differs from the fundamental programming language of the, exists the fundamental basis of Within the wiring interface 117 of the enhanced JAVA-based graphical development tool 115, the developer 105 can be presented with a JSON bridge usage selector 128 when connecting a JAVA-based component 125 with a non-JAVA-based component 130. The JSON bridge usage selector 128 can represent a selection mechanism by which the developer 105 can indicate that changes in the property 127 are to be communicated to the non-JAVA-based component 130 using JSON and the JSON bridge 145.

It should be noted that current graphical composite application development tools do not support the direct invocation of a JSON bridge 145 from within a graphical user interface, such as a wiring interface 117. Using a JSON bridge 145 within current graphical composite application development tools can require additional complex programming on the part of the developer 105 outside of the graphical programming environment.

Figure 2:
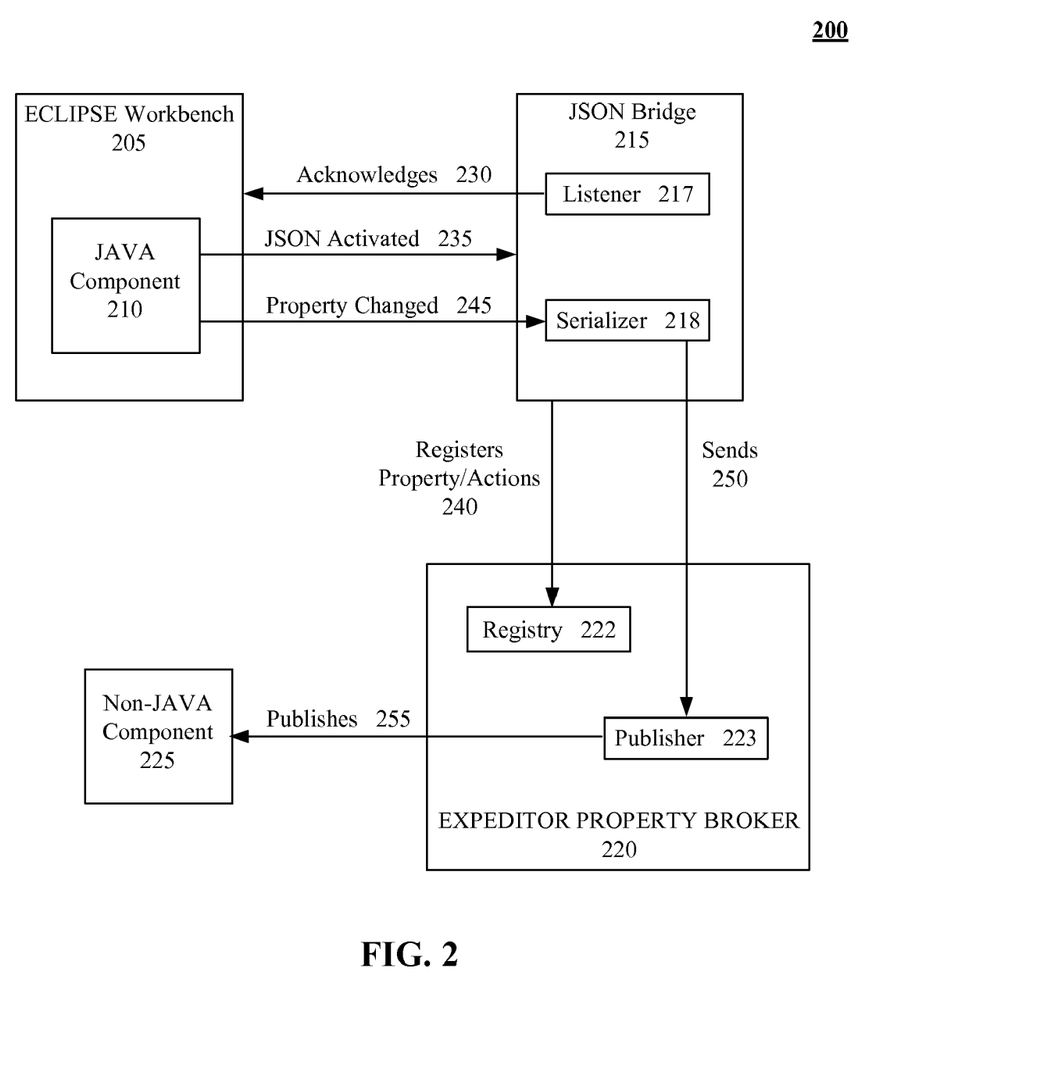
FIG. 2 is a process flow detailing the communication of a JAVA-based component and a non-JAVA-based component utilizing a JSON bridge from within an enhanced JAVA-based graphical development tool in accordance with an embodiment of the inventive arrangements disclosed herein.

FIG. 2 is a process flow 200 detailing the communication of a JAVA-based component 210 and a non-JAVA-based component 225 utilizing a JSON bridge 215 from within an enhanced JAVA-based graphical development tool 205 in accordance with an embodiment of the inventive arrangements disclosed herein. The events and elements of process flow 200 can represent a specific embodiment of system 100.

In process flow 200, the ECLIPSE WORKBENCH 205, JSON bridge 215, and EXPEDITOR PROPERTY BROKER 220 can represent specific components corresponding to the enhanced JAVA-based graphical development tool 115, JSON bridge 145, and property distribution manager 165 of system 100, respectively. The arrows illustrated in process flow 200 can represent events that can trigger interaction between the components 205, 215, and 220.

Interaction between the components 205, 215, and 220 of process flow 200 can begin in step 230 where a listener component 217 of the JSON bridge 215 can acknowledge the accessing of a JAVA-based composite application within the ECLIPSE WORKBENCH 205. The listener component 217 can detect the activation of a JSON bridge usage selector by a developer for a specific JAVA component 210 in step 235.

In response to JSON activation for the JAVA component 210, step 240 can execute where the JSON bridge 215 registers the property and associated actions with the EXPEDITOR PROPERTY BROKER 220. The EXPEDITOR PROPERTY BROKER 220 can store the registration of the property and associated actions in a registry 222.

In step 245, the listener component 217 can detect a change in the property of the JAVA component 210. The data corresponding to the changed property can be acquired by the JSON bridge 215 and processed by a serializer 218. The serializer 218 can serialize the changed property data into JSON and send the serialized data to the EXPEDITOR PROPERTY BROKER 220 in step 250.

In step 255, a publisher component 223 of the EXPEDITOR PROPERTY BROKER 220 can publish the received serialized data to the intended non-JAVA component 225 in accordance with the associated action stored in the registry 222.

Figure 3:
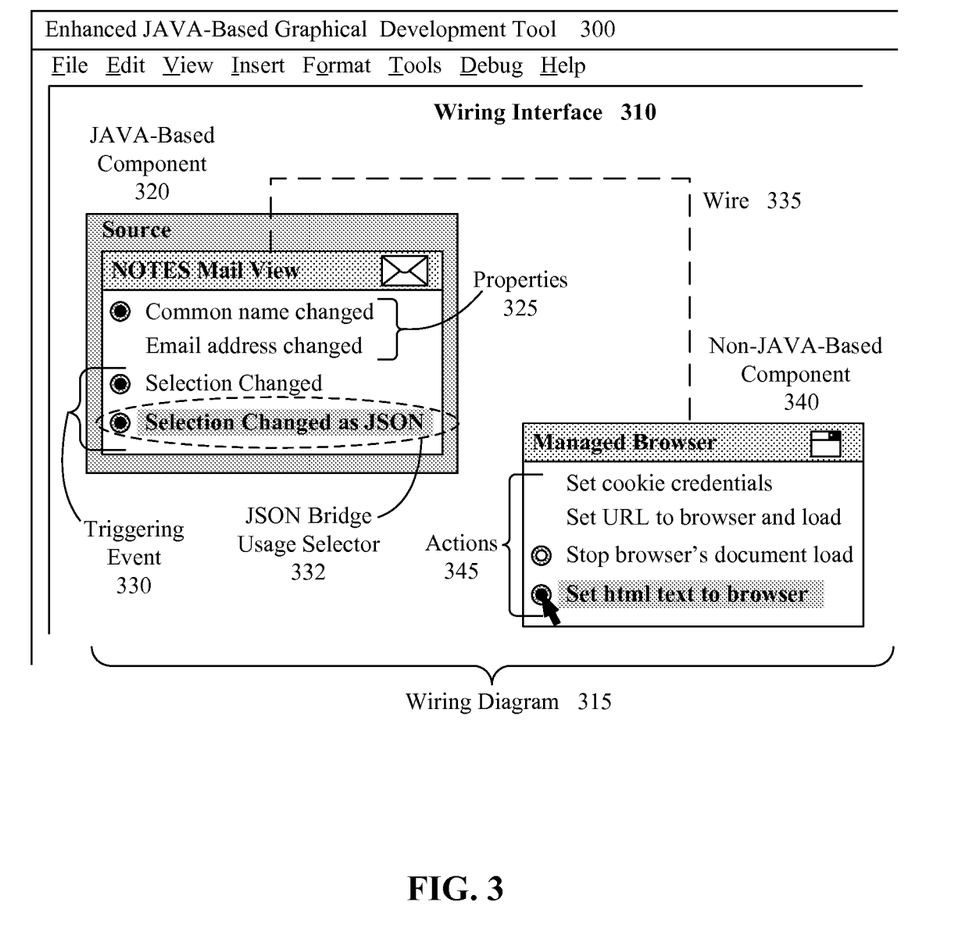
FIG. 3 is an illustration of a wiring interface of an enhanced JAVA-based graphical development tool allowing use of a JSON bridge in accordance with an embodiment of the inventive arrangements disclosed herein.

FIG. 3 is an illustration of a wiring interface 310 of an enhanced JAVA-based graphical development tool 300 allowing use of a JSON bridge in accordance with embodiments of the inventive arrangements disclosed herein. Wiring interface 310 can used within the context of system 100 and/or process flow 200.

It should be noted that the wiring interface 310 of the enhanced JAVA-based graphical development tool 300 shown in FIG. 3 is for illustrative purposes only, and is not intended to represent a comprehensive embodiment. As such, additional components and/or configurations can be included without deviating from the spirit of the present disclosure.

A wiring diagram 315 representing a JAVA-based composite application can be presented within the wiring interface 310 of the enhanced JAVA-based graphical development tool 300. The wiring diagram 315 can include JAVA-based components 320 and/or non-JAVA-based components 340 and wires 335 that define communication pathways between component 320 and 340. In this example, the wiring diagram 315 illustrates a JAVA-based component 320 wired to a non-JAVA-based component 340.

Since the wiring interface 310 allows for interactions to be defined between the components 320 and 340 of the JAVA-based composite application, presentation of the components 320 and 340 can include the applicable functionality and/or operations allowed by the enhanced JAVA-based graphical development tool 300.

As shown in this example, the JAVA-based component 320 can act as the data source for the non-JAVA-based component 340. As such, the JAVA-based component 320 can be presented with its associated properties 325 and triggering events 330 and the non-JAVA-based component 340 can contain associated actions 345. A JSON bridge usage selector 332 can be included within the triggering events 330 to allow a developer to utilize a JSON bridge to communicate with the non-JAVA-based component 340 when the triggering event 330 occurs.

The JSON bridge usage selector 332 can represent the user-selectable mechanism, such as the radio button shown in this example, by which use of the JSON bridge can be indicated within the enhanced JAVA-based graphical development tool 300. In this example, a developer has defined that any changes to the 'Common Name' property 325 of the NOTES Mail View 320 should be serialized into JSON by the JSON bridge prior to being sent to the Managed Browser 340.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for utilizing a JAVASCRIPT Object Notation (JSON) bridge during JAVA-based composite application development comprising:
   receiving of a user-selected command to present a wiring diagram of a JAVA-based composite application by an enhanced JAVA-based composite application development tool, wherein said JAVA-based composite application comprises at least one JAVA-based component and at least one non-JAVA-based component, wherein at least one property of at least one JAVA-based component of the JAVA-based composite application is communicatively wired to a non-JAVA-based component;
   acknowledging access of the JAVA-based composite application by a JSON bridge, wherein said registration establishes a communication pathway for the JSON bridge to receive information regarding pertinent user-executed commands performed within the enhanced JAVA-based composite application development tool;
   visually rendering the wiring diagram of the JAVA-based composite application within a wiring interface of the enhanced JAVA-based composite application development tool; and
   for each property of a JAVA-based component communicatively wired to a non-JAVA-based component, presenting within the wiring interface a user-selectable option to utilize the JSON bridge as a communication medium to the non-JAVA-based component, wherein the JSON bridge is a component of a JAVA-based composite application framework in which the JAVA-based composite application and the enhanced JAVA-based composite application development tool operate; and
   when a user-entered change occurs to a property of the JAVA-based component communicatively wired to the non-JAVA-based component and said property having the JSON bridge option selected, automatically invoking the JSON bridge to communicate data associated with the user-entered change to the communicatively wired non-JAVA-based component, wherein said data is stored within a source document conforming to a standardized markup language.

2. The method of claim 1, further comprising:
   receiving a user-selection of the JSON bridge option for the property of the JAVA-based component within the wiring interface; and
   automatically registering the property and related actions with a property distribution manager, wherein said registration is stored within a registry of the property distribution manager.

3. The method of claim 1, wherein the registration of access to the JAVA-based composite application is performed by a listener component of the JSON bridge.

4. The method of claim 1, wherein the standardized markup language is an eXtensible Markup Language (XML), wherein the data corresponding to the user-entered property change is stored as at least one XML tag.

5. The method of claim 1, wherein the invoking of the JSON bridge further comprises:
   detecting the user-entered change to the property of the JAVA-based component by the JSON bridge;
   retrieving the data associated with the user-entered change;
   serializing the retrieved data into JSON; and
   conveying the serialized data to a property distribution manager.

6. The method of claim 5, further comprising:
   upon receipt of the serialized data, the property distribution manager publishing the serialized data to the non-JAVA-based component.

7. The method of claim 1, wherein the enhanced JAVA-based composite application development tool utilizes an ECLIPSE WORKBENCH.

8. The method of claim 1, wherein the JAVA-based composite application framework is based upon a LOTUS EXPEDITOR framework.

9. A computer program product comprising:
   one or more computer-readable, non-transitory storage devices;
   program instructions, stored on at least one of the one or more storage devices, to receive of a user-selected command to present a wiring diagram of a JAVA-based composite application by an enhanced JAVA-based composite application development tool, wherein said JAVA-based composite application comprises at least one JAVA-based component and at least one non-JAVA-based component, wherein at least one property of at least one JAVA-based component of the JAVA-based composite application is communicatively wired to a non-JAVA-based component;
   program instructions, stored on at least one of the one or more storage devices, to acknowledge access of the JAVA-based composite application by a JAVASCRIPT Object Notation (JSON) bridge, wherein said registration establishes a communication pathway for the JSON bridge to receive information regarding pertinent user-executed commands performed within the enhanced JAVA-based composite application development tool;
   program instructions, stored on at least one of the one or more storage devices, to visually render the wiring diagram of the JAVA-based composite application within a wiring interface of the enhanced JAVA-based composite application development tool; and
   program instructions, stored on at least one of the one or more storage devices, to, for each property of a JAVA-based component communicatively wired to a non-JAVA-based component, present within the wiring interface a user-selectable option to utilize the JSON bridge as a communication medium to the non-JAVA-based component, wherein the JSON bridge is a component of a JAVA-based composite application framework in which the JAVA-based composite application and the enhanced JAVA-based composite application development tool operate; and
   program instructions, stored on at least one of the one or more storage devices, to, when a user-entered change occurs to a property of the JAVA-based component communicatively wired to the non-JAVA-based component and said property having the JSON bridge option selected, automatically invoke the JSON bridge to communicate data associated with the user-entered change to the communicatively wired non-JAVA-based component, wherein said data is stored within a source document conforming to a standardized markup language.

10. The computer program product of claim 9, further comprising:
   program instructions, stored on at least one of the one or more storage devices, to receive a user-selection of the JSON bridge option for the property of the JAVA-based component within the wiring interface; and
   program instructions, stored on at least one of the one or more storage devices, to automatically register the property and related actions with a property distribution manager, wherein said registration is stored within a registry of the property distribution manager.

11. The computer program product of claim 9, further comprising:
   program instructions, stored on at least one of the one or more storage devices, to detect the user-entered change to the property of the JAVA-based component by the JSON bridge;
   program instructions, stored on at least one of the one or more storage devices, to retrieve the data associated with the user-entered change;
   program instructions, stored on at least one of the one or more storage devices, to serialize the retrieved data into JSON; and
   program instructions, stored on at least one of the one or more storage devices, to convey the serialized data to a property distribution manager.

12. The computer program product of claim 11, further comprising:
   program instructions, stored on at least one of the one or more storage devices, to, upon receipt of the serialized data, publish the serialized data to the non-JAVA-based component.

13. A computer system comprising:
   one or more processors and one or more computer-readable, tangible storage devices;
   program instructions, stored on at least one of the one or more storage devices for execution by at least one of the one or more processors, to receive of a user-selected command to present a wiring diagram of a JAVA-based composite application by an enhanced JAVA-based composite application development tool, wherein said JAVA-based composite application comprises at least one JAVA-based component and at least one non-JAVA-based component, wherein at least one property of at least one JAVA-based component of the JAVA-based composite application is communicatively wired to a non-JAVA-based component;
   program instructions, stored on at least one of the one or more storage devices for execution by at least one of the one or more processors, to acknowledge access of the JAVA-based composite application by a JAVASCRIPT Object Notation (JSON) bridge, wherein said registration establishes a communication pathway for the JSON bridge to receive information regarding pertinent user-executed commands performed within the enhanced JAVA-based composite application development tool;
   program instructions, stored on at least one of the one or more storage devices for execution by at least one of the one or more processors, to visually render the wiring diagram of the JAVA-based composite application within a wiring interface of the enhanced JAVA-based composite application development tool; and
   program instructions, stored on at least one of the one or more storage devices for execution by at least one of the one or more processors, to, for each property of a JAVA-based component communicatively wired to a non-JAVA-based component, present within the wiring interface a user-selectable option to utilize the JSON bridge as a communication medium to the non-JAVA-based component, wherein the JSON bridge is a component of a JAVA-based composite application framework in which the JAVA-based composite application and the enhanced JAVA-based composite application development tool operate; and
   program instructions, stored on at least one of the one or more storage devices for execution by at least one of the one or more processors, to, when a user-entered change occurs to a property of the JAVA-based component communicatively wired to the non-JAVA-based component and said property having the JSON bridge option selected, automatically invoke the JSON bridge to communicate data associated with the user-entered change to the communicatively wired non-JAVA-based component, wherein said data is stored within a source document conforming to a standardized markup language.

14. The computer system of claim 13, further comprising:
   program instructions, stored on at least one of the one or more storage devices for execution by at least one of the one or more processors, to receive a user-selection of the JSON bridge option for the property of the JAVA-based component within the wiring interface; and
   program instructions, stored on at least one of the one or more storage devices for execution by at least one of the one or more processors, to automatically register the property and related actions with a property distribution manager, wherein said registration is stored within a registry of the property distribution manager.

15. The computer system of claim 13, wherein the registration of access to the JAVA-based composite application is performed by a listener component of the JSON bridge.

16. The computer system of claim 13, wherein the standardized markup language is an eXtensible Markup Language (XML), wherein the data corresponding to the user-entered property change is stored as at least one XML tag.

17. The computer system of claim 13, wherein the invoking of the JSON bridge further comprises:
   program instructions, stored on at least one of the one or more storage devices for execution by at least one of the one or more processors, to detect the user-entered change to the property of the JAVA-based component by the JSON bridge;
   program instructions, stored on at least one of the one or more storage devices for execution by at least one of the one or more processors, to retrieve the data associated with the user-entered change;
   program instructions, stored on at least one of the one or more storage devices for execution by at least one of the one or more processors, to serialize the retrieved data into JSON; and
   program instructions, stored on at least one of the one or more storage devices for execution by at least one of the one or more processors, to convey the serialized data to a property distribution manager.

18. The computer system of claim 17, further comprising:
   program instructions, stored on at least one of the one or more storage devices for execution by at least one of the one or more processors, to, upon receipt of the serialized data, publish the serialized data to the non-JAVA-based component.

19. The computer system of claim 13, wherein the enhanced JAVA-based composite application development tool utilizes an ECLIPSE WORKBENCH.

20. The computer system of claim 13, wherein the JAVA-based composite application framework is based upon a LOTUS EXPEDITOR framework.

* * * * *